US011363266B2

(12) United States Patent
Reznic et al.

(10) Patent No.: US 11,363,266 B2
(45) Date of Patent: Jun. 14, 2022

(54) METHOD AND SYSTEM OF PERFORMING INTER-FRAME PREDICTION IN VIDEO COMPRESSION

(71) Applicant: Amimon Ltd., Ra'anana (IL)

(72) Inventors: Zvi Reznic, Tel Aviv (IL); Guy Dorman, Mishmar David (IL)

(73) Assignee: AMIMON LTD., Ra'anana (IL)

( * ) Notice: Subject to any disclaimer, the term of this patent is extended or adjusted under 35 U.S.C. 154(b) by 74 days.

(21) Appl. No.: 16/462,531

(22) PCT Filed: Oct. 7, 2018

(86) PCT No.: PCT/IL2018/051086
§ 371 (c)(1),
(2) Date: May 21, 2019

(87) PCT Pub. No.: WO2019/092690
PCT Pub. Date: May 16, 2019

(65) Prior Publication Data
US 2021/0281840 A1   Sep. 9, 2021

Related U.S. Application Data

(60) Provisional application No. 62/664,175, filed on Apr. 29, 2018, provisional application No. 62/583,521, filed on Nov. 9, 2017.

(51) Int. Cl.
*H04N 19/119* (2014.01)
*H04N 19/139* (2014.01)
(Continued)

(52) U.S. Cl.
CPC ......... *H04N 19/119* (2014.11); *H04N 19/139* (2014.11); *H04N 19/176* (2014.11); *H04N 19/513* (2014.11)

(58) Field of Classification Search
None
See application file for complete search history.

(56) References Cited

U.S. PATENT DOCUMENTS 5,136,377 A    8/1992  Johnston
6,847,684 B1 *  1/2005  Hsu ...................... H04N 19/137
                                                          375/240.03
(Continued)

FOREIGN PATENT DOCUMENTS

WO     WO1997016031 A1 * 10/1995

OTHER PUBLICATIONS

International Search Report in PCT/IL2018/051086, dated Jan. 7, 2019.
(Continued)

*Primary Examiner* — Jessica M Prince
(74) *Attorney, Agent, or Firm* — Browdy and Neimark, PLLC

(57) ABSTRACT

Systems, devices, and methods of performing inter-frame prediction in video compression. A method includes: partitioning a video frame into superblocks, each superblock includes a plurality of macroblocks; determining an upper boundary on attributes that are associated with residual blocks of the plurality of macroblocks, based on pre-defined constraints on the total number of bits allocated for motion vector descriptions in a superblock; for each macroblock in a superblock, determining a partition size and a motion vector resolution which yield, for all macroblocks in the superblock, a motion vector description and a corresponding residual with attributes less than or equal to the upper boundary.

24 Claims, 9 Drawing Sheets

(51) Int. Cl.
*H04N 19/176* (2014.01)
*H04N 19/513* (2014.01)

(56) References Cited

U.S. PATENT DOCUMENTS

| | | | |
|---|---|---|---|
| 9,332,276 B1* | 5/2016 | Gu | H04N 19/105 |
| 9,560,361 B2* | 1/2017 | Zhao | H04N 19/149 |
| 10,390,039 B2* | 8/2019 | Zhu | H04N 19/54 |
| 2007/0153916 A1* | 7/2007 | Demircin | H04N 21/2365 |
| | | | 375/240.26 |
| 2009/0225843 A1* | 9/2009 | Lee | H04N 19/11 |
| | | | 375/E7.123 |
| 2011/0170596 A1 | 7/2011 | Shi | |

OTHER PUBLICATIONS

Written Opinion of the International Searching Authority in PCT/IL2018/051086, dated Jan. 7, 2019.

\* cited by examiner

| # | Motion Vector Strategy | Total Bits | Residual Complexity |
|---|---|---|---|
| 1 | Single 16x16 block, full pixel | 2 | 1562 |
| 2 | Single 16x16 block, half pixel | 3 | 1109 |
| 3 | Two vertical 16x8 blocks, full pixel | 3 | 926 |
| 4 | Two vertical 16x8 blocks, half pixel | 5 | 926 |
| ... | | | |
| 32 | Sixteen blocks of 4x4, 1/4 pixel | 34 | 28 |

FIGURE 4

| # | Motion Vector Strategy | Total Bits | Residual Complexity |
|---|---|---|---|
| 1 | Single 16x16 block, full pixel | 2 | 1562 |
| 2 | ~~Single 16x16 block, half pixel~~ | ~~3~~ | ~~1109~~ |
| 3 | Two vertical 16x8 blocks, full pixel | 3 | 926 |
| 4 | ~~Two vertical 16x8 blocks, half pixel~~ | ~~5~~ | ~~926~~ |
| ... | | | |
| 32 | Sixteen blocks of 4x4, 1/4 pixel | 34 | 28 |

| # | RESIDUAL COMPLEXITY CEILING VALUES | MOTION VECTOR BIT ALLOCATION |
|---|---|---|
| 1 | 2000 | 2.3 |
| 2 | 1500 | 2.9 |
| 3 | 1000 | 3.4 |
| 4 | 900 | 5.3 |
| ... | ... | |
| 32 | 40 | 31 |

FIGURE 7

METHOD AND SYSTEM OF PERFORMING INTER-FRAME PREDICTION IN VIDEO COMPRESSION

CROSS-REFERENCE TO RELATED APPLICATIONS

This patent application is a National Stage of PCT international application serial number PCT/IL2018/051086, having an international filing date of Oct. 7, 2018, published as International Publication number WO 2019/092690 A1, which is hereby incorporated by reference in its entirety; which claims priority and benefit (i) from United States provisional patent application number U.S. 62/583,521 filed on Nov. 9, 2017, and (ii) from United States provisional patent application number U.S. 62/664,175, filed on Apr. 29, 2018, all of which are hereby incorporated by reference in their entirety.

FIELD

The present invention relates to video compression generally, and to a method for interframe prediction in video compression.

BACKGROUND

In video compression, an interframe is a frame which is predicted based on a past encoded frame and optionally future encoded frame by using temporal and/or spatial redundancy between the frames. Usually these frames are adjacent frames in a video sequence. Frequently, the only difference between the past and optionally encoded future frames, hereinafter referred to as "reference frames" and the predicted frame is due to movement of the camera or of an object in the predicted frame. In predicting the frame, the encoder will search for matching data in the reference frames and, using motion estimation, will generate a motion vector pointing to the location of the data in the reference frame. Usually, the match is not exact, and the encoder will compute the difference between them as residual values or "residual", which may be expressed by the equation residual=actual pixels—predicted pixels.

One technique for motion estimation involves block matching which involves dividing the predicted frame into blocks of data (pixels) and searching for similar blocks in the reference frames. The encoder then generates a motion vector which points to the location of the similar blocks in the reference frames. The frames may be partitioned into blocks of 16×16 pixels and into smaller blocks such as 16×8 pixels, 8×16 pixels, 8×8 pixels, 8×4 pixels, 4×8 pixels, and 4×4 pixels. The accuracy of the motion vector may be defined in pixels or partial pixels, for example, 1 pixel, half pixel, ¼ pixel, ⅛ pixel and so on. Generally, a greater accuracy is achieved by a smaller displacement resolution or motion vector resolution (e.g. ⅛ pixel) although this requires a greater number of bits to encode the motion vector and consequently requiring a greater bandwidth which may not be available. FIG. 1 schematically shows a section of a frame 100 with exemplary block partition sizes including a block 16×16 pixels 102, a block 8×16 pixels 104, a block 16×8 pixels 106, a block 8×8 pixels 108, a block 4×8 pixels 110, a block 4×8 pixels 112, and two blocks 4×4 pixels 114.

Encoder generating of the motion vector may be described by a three, optionally four step motion vector coding process. The coding process is shown in FIG. 2 in flowchart 200 and described herein below. The number of bits which are required to describe a certain block depends on the block size partitioning of the frame, the motion vector accuracy, the motion vector prediction error, and the code length sent to the decoder which may be a variable code length (VCL).

At an optional step 202, the frame may be partitioned into small block sizes, for example 4×4 pixels and motion estimation is performed to determine the motion vector with a high degree of accuracy, for example ¼ pixel.

At step 204, the frame may be partitioned into blocks of any suitable size (e.g. 16×8 pixels, 8×16 pixels, 8×8 pixels, 8×4 pixels, 4×8 pixels, and 4×4 pixels). If optional step 202 was performed, the frame may be partitioned into larger block sizes based on the results of step 202 if larger block sizes yield the same or similar results as the 4×4 pixels block size. Information associated with the size of the blocks may be coded using variable length coding and transmitted from the encoder to the decoder.

At step 206, the accuracy of the motion vector is determined. The accuracy may be a full pixel, ½ pixel, ¼ pixel, or smaller. If optional step 202 was performed, the accuracy which was chosen in step 206 may be lower than the accuracy used in step 202. For example, if the accuracy used in step 202 was ¼ pixel, then the accuracy in this step 206 may be lower, such as ½ pixel or a full pixel if these accuracies yield the same or comparable results as in step 202. As in step 204, information associated with the accuracy may be coded using variable length coding and transmitted from the encoder to the decoder.

At step 207, perform motion estimation using the accuracy from step 206. Alternatively, the results of the motion estimation of step 202 may be used.

At 208 the video block may be predicted based on the reference block in the reference frame. The prediction error associated with the motion vector may be determined from the reference block. An example of a predictor for the X value of the motion vector may be:

$$\Delta \widehat{X}_n = \Delta X_{n-1}, \ e_n = \Delta X_n - \Delta \widehat{X}_n.$$

At step 209, predict the motion vector from previously encoded motion vectors and calculate motion vector prediction error.

SUMMARY

There is provided, in accordance with an embodiment of the present invention, a method of performing inter-frame prediction in video compression, the method may include partitioning a video frame into superblocks, each superblock may include a plurality of macroblocks; determining an upper boundary on attributes associated with residual blocks of the plurality of macroblocks based on pre-defined constraints on the total number of bits allocated for motion vector descriptions in a superblock; and determining for each macroblock in a superblock a partition size and a motion vector resolution which may yield for all macroblocks in the superblock a motion vector description and a corresponding residual with attributes less than or equal to the upper boundary. Each macroblock of the plurality of macroblocks may include 16×16 pixels.

In some embodiments, the method may include determining a number of bits required to code a motion vector for each of the block partitionings based on predetermined pixel accuracies.

In some embodiments, the method may include determining a residual complexity in a residual block associated with each of the block partitioning.

In some embodiments, the method may include comparing for each block partitioning, the number of bits required to code a motion vector and a residual complexity value associated with the residual block.

In some embodiments, the method may include discarding all block partitionings associated with motion vectors requiring the same number of bits for coding except for the block partitioning with a least residual complexity value.

In some embodiments, the method may include assigning an upper boundary requirement to residual complexity values of residual blocks.

There is provided, in accordance with an embodiment of the present invention, an encoder for generating fixed-rate motion vectors for video compression, the encoder may be configured to partition a video frame into superblocks, each superblock may include a plurality of macroblocks; to determine an upper boundary on attributes associated with residual blocks of the plurality of macroblocks based on pre-defined bit constraints on the total number of bits allocated for motion vector descriptions in a superblock; and to determine for each macroblock in a superblock a partition size and a motion vector resolution which may yield for all macroblocks in the superblock a motion vector description and a corresponding residual with attributes less than or equal to the upper boundary. Optionally, each macroblock of the plurality of macroblocks includes 16×16 pixels.

In some embodiments the encoder may determine a number of bits required to code a motion vector for each of the block partitionings based on a predetermined motion vector resolution. In some embodiments the encoder may determine a residual complexity in a residual block associated with each of the block partitioning.

In some embodiments the encoder may compare for each block partitioning, the number of bits required to code a motion vector and a residual complexity value associated with the residual block. In some embodiments the encoder may discard all block partitionings associated with motion vectors requiring the same number of bits for coding except for the block partitioning with a least residual complexity value. In some embodiments the encoder may assign an upper boundary requirement to residual complexity values of residual blocks.

In some embodiments, the attributes may include a residual complexity. Optionally, the attributes may include a measure of a total energy in the residual blocks. Optionally, the attributes may include a measure of entropy of the quantized DCT taps of the residual blocks.

In some embodiments, the partition size may include any one of a 16×16 pixel size, 16×8 pixel size, 8×16 pixel size, 8×8 pixel size, 8×4 pixel size, 4×8 pixel size, and 4×4 pixel size. In some embodiments, the motion vector resolution may include any one of a full pixel, a half pixel, and a quarter pixel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is an exemplary table associated with a first step 302 of the method shown in FIG. 3, according to an embodiment of the present invention;

FIG. 5 is an exemplary table associated with a second step 304 of the method shown in FIG. 3, according to an embodiment of the present invention;

FIG. 7 is an exemplary table associated with a fourth step 308 of the method shown in FIG. 3, according to an embodiment of the present invention;

Figure 1:
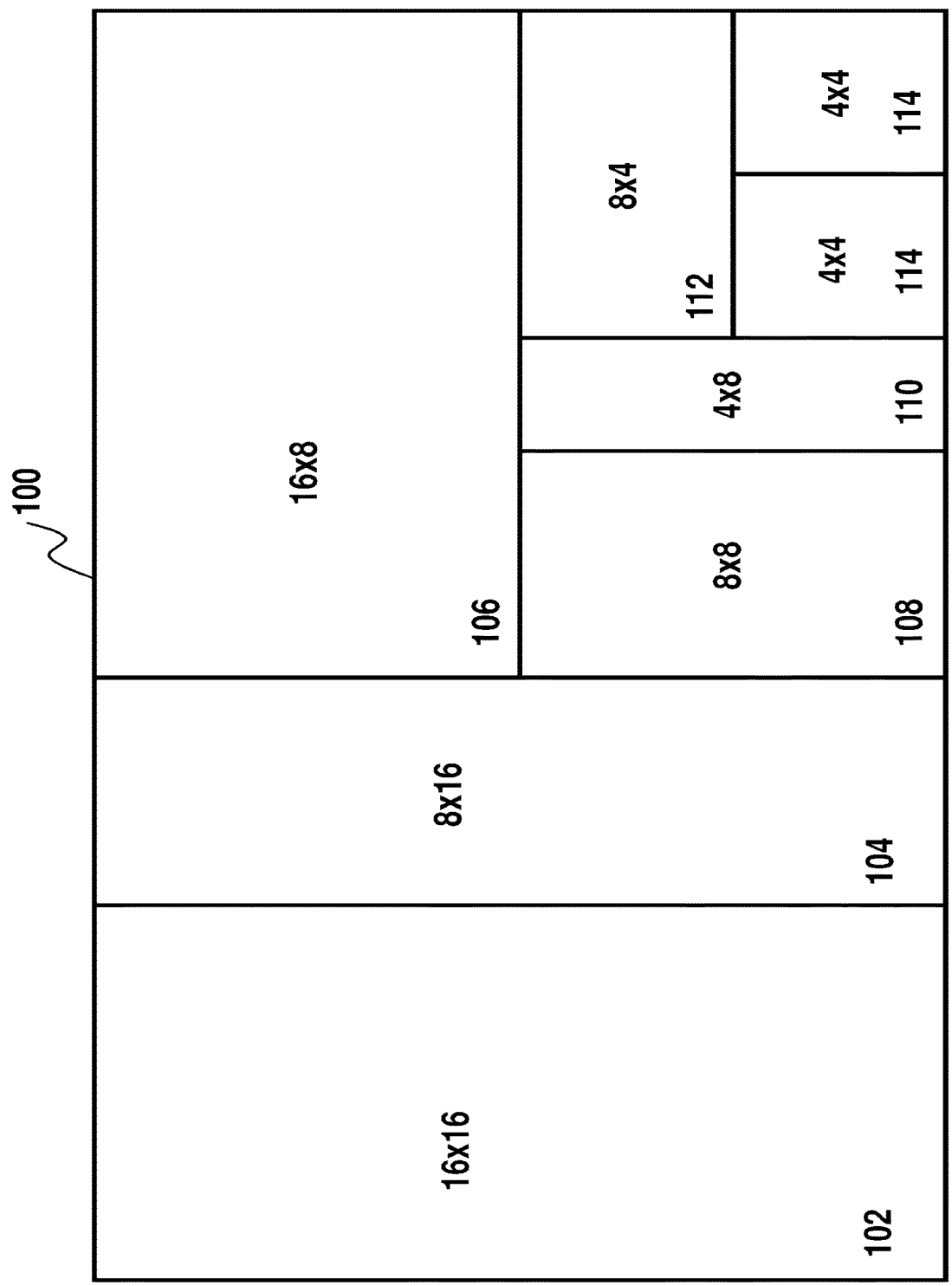
FIG. 1 schematically illustrates a section of a video frame with exemplary block partition sizes including a block 16×16 pixels, a block 8×16 pixels, a block 16×8 pixels, a block 8×8 pixels, a block 8×4 pixels, a block 4×8 pixels, and two blocks 4×4 pixels.
Figure 2:
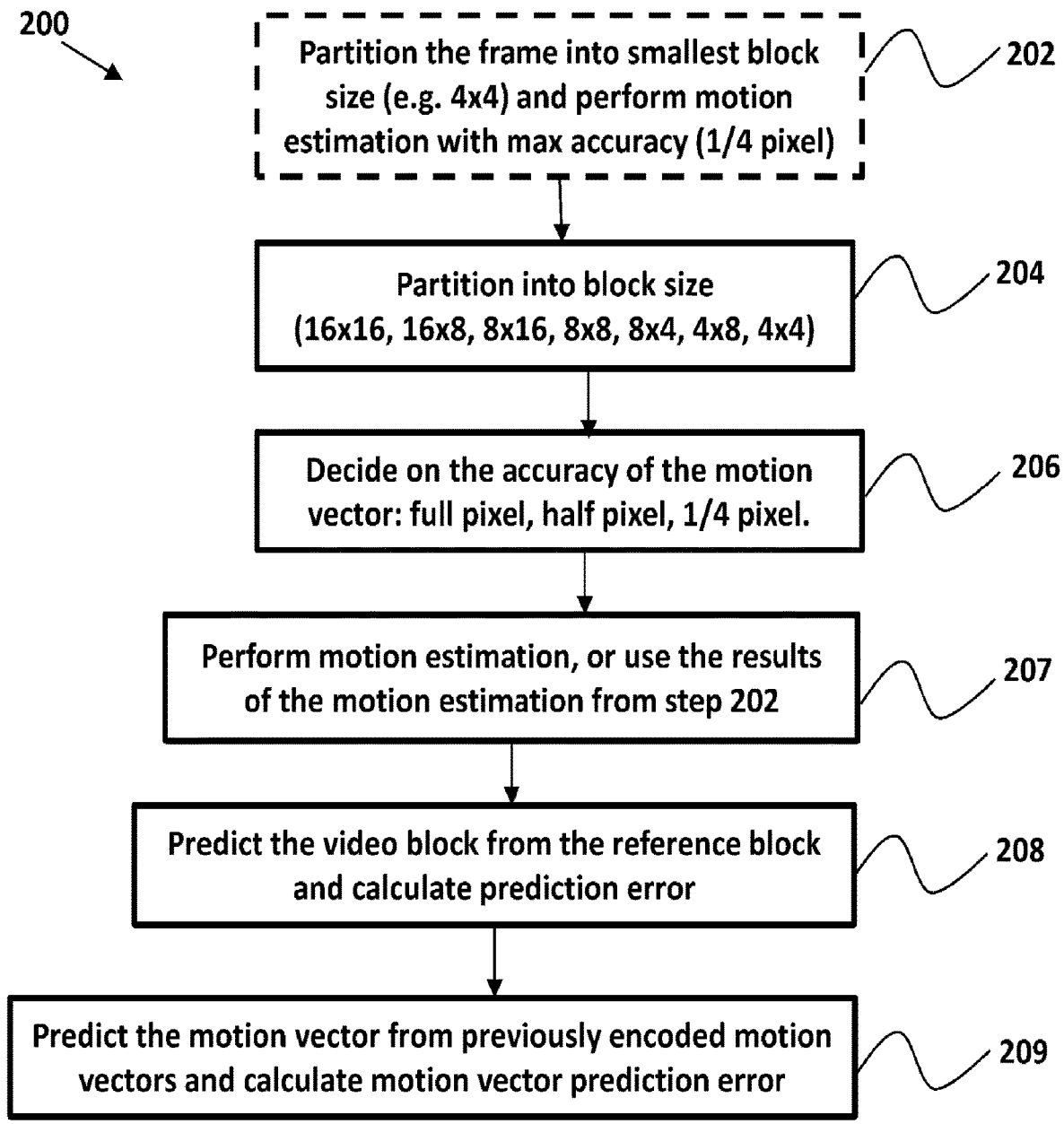
FIG. 2 is an exemplary flowchart of a motion vector coding process.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Two important parameters in video compression for low latency wireless video are a low bit rate and that it be relatively fixed. The need for fixed bit rate stems from the fact that variable bit rate calls for reserving extra bandwidth to accommodate an occasional rise in the bit rate of the compressed stream. Since the extra reserved bandwidth is only used part of the time, it is being wasted the rest of the time (since it was allocated but not used). Applicants have realized that motion vectors used in video compression generated using known motion estimation techniques suffer from high variability in bit rate, which requires high amount of extra reserved bandwidth.

Applicants have further realized that the problems associated with the high variability of the motion vectors may be solved by partitioning a video frame into superblocks, each superblock made up of a plurality of macroblocks and coding all the motion vectors in the superblock such that the number of bits in each macroblock is different but the sum of the number of bits of all the macroblock in the superblocks is relatively fixed, relatively to other superblocks. Each macroblock may be of a size of 16×16 pixels and each superblock may include 256 macroblocks. These motion vectors coded with a same number of bits per superblock may be referred to hereinafter as "fixed-rate" motion vectors and may have a relatively low variability.

According to an embodiment of the present invention, Applicants have devised a method to code fixed-rate motion vectors by partitioning each superblock in a video frame into macroblocks which may be partitioned into smaller blocks of a predetermined size, and determining for each block, based on a predetermined accuracy, the number of bits required to code the motion vector and a residual complexity associated with an estimate of the compressibility of the residual block. This compressibility may be determined for example, by calculating the total energy in the residual block and the entropy of the residual block after quantization.

The residual complexity may be calculated in several ways. For example, the residual complexity may be calculated as the sum of the squares of the residual pixels, where each pixel has 3 colors (e.g. R, G, B; or Y, Cr, Cb). Alternatively, it can be calculated as the sum of the squares of the residual pixels, but only from one color, e.g. Y or G. Alternatively, it may be calculated as the sum of the squares of the DCT taps or the residual pixels, where the DCT taps is the result of the two-dimensional Discrete Cosine Transform (DCT). Alternatively, the residual complexity may be calculated as the sum of the squares of a subset of the DCT taps. Such subset may be for example, the DCT taps of the Y pixels only, or a subset which includes all the DCT taps excluding the first DCT tap, where the first DCT taps is sometimes referred to as the DC tap.

In all of the above examples, sum of squares can be replaced with sum of absolute. In case of squared values, the complexity is measured in units which are correlated to "power", whereas in the case of absolute values the complexity is measure in units of "amplitude".

The residual complexity may be also calculated as a certain entropy in units of "bits". For example, one may perform two-dimensional DCT followed by quantization of the DCT taps, followed by a certain coding of the quantized values, and then count the number of bits in the coded stream, and use that number of bits as the residual complexity number. The coding of the quantized values can be done in several ways, for example CABAC (Context-adaptive binary arithmetic coding), CAVLC (Context-adaptive variable-length coding), Exp-Golomb coding, Huffman coding or other coding. Another option is to calculate the empiric entropy of the quantized DCT taps.

The method may include iteratively repeating the calculation of the number of bits required to code the motion vector and the calculation of the residual complexity for a same macroblock using different macroblock partitioning arrangements each time. For example, in a first run, a macro block may be not be further partitioned, or, partitioned into sub-blocks of 16×16 pixels and motion estimation may be performed using an accuracy of a full pixel to determine the number of bits required to code the motion vector and to determine the residual complexity. In a second run, the motion vector coding and the residual complexity may be computed based on the macroblock being partitioned into a single sub-block of 16×16 pixels (i.e. the macroblock is not further partitioned) and an accuracy of ½ pixel. A third run may then be performed with the macroblock partitioned into smaller sub-blocks of 16×8 pixels and an accuracy of a full pixel. This procedure may be repeated as many times as desired using different smaller block sizes and accuracies. The method may additionally include choosing a target residual complexity for all the macroblocks in the super-block based on an available bandwidth budget, and coding the motion vectors using those block sizes and accuracies which require the least amount of bits to code the motion vector for the macroblock while achieving the target residual complexity.

Figure 3:
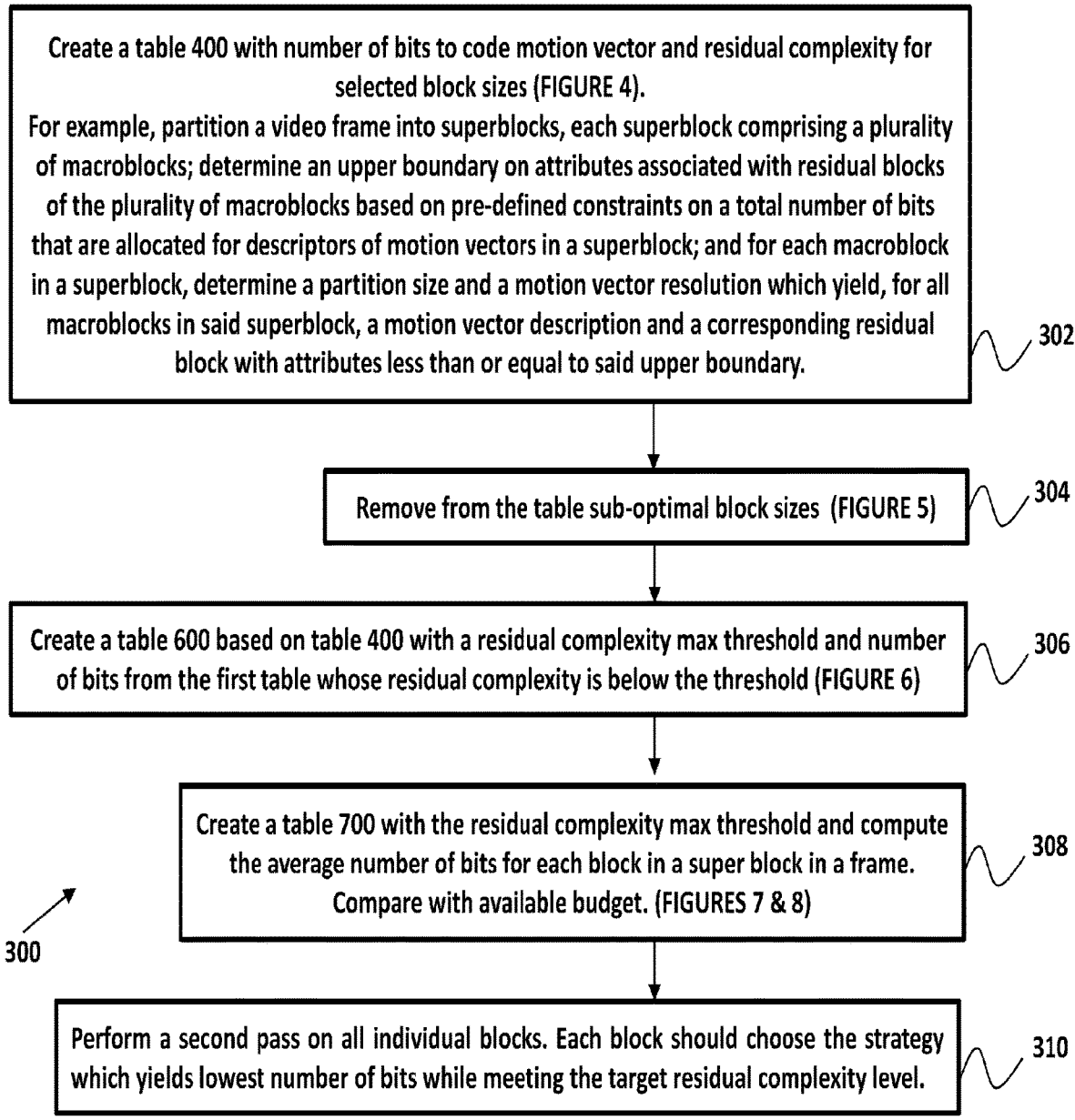
FIG. 3 is a flow chart of an exemplary method of fixed-rate motion vectors coding, according to an embodiment of the present invention.

Reference is now made to FIG. 3 which is a flow chart 300 of an exemplary method of coding fixed-rate motion vectors, according to an embodiment of the present invention. The skilled person may realize that the method shown in the figure and described herein is exemplary, and that the method may be practiced using more steps or less steps, or using a different sequence of steps or operations.

In first step 302, a table is created, for example as shown in FIG. 4 at 400, which includes three columns. A first column 402 which lists row numbers, a second column 404 wherein are listed options of motion vector strategy which include a plurality of possible subblocks partition sizes for the macroblock with different motion estimation accuracies (hereinafter the terms "blocks" and "sub-blocks" may be used interchangeably), a third column 406 wherein are listed the total number of bits estimated for coding the motion vector associated with each motion vector strategy, and a fourth column 408 wherein are listed the residual complexity values computed for each motion vector strategy.

In the example shown in table 400, the motion vector strategy refers to 32 different options (only five are shown). Row #1 shows a motion vector strategy for a macroblock which is not partitioned and the motion estimation accuracy is a full pixel. The total number of bits required for coding the motion vector is calculated to be 2 and the computed residual complexity is calculated to be 1562. Row #2 shows a motion vector strategy for a macroblock which is not partitioned and the motion estimation accuracy is a half pixel. The total number of bits required for coding the motion vector is calculated to be 3 and the computed residual complexity is calculated to be 1109. Row #3 shows a motion vector strategy for a macroblock which is partitioned into two blocks of 16×8 pixels and the motion estimation accuracy is a full pixel. The total number of bits required for coding the motion vector is calculated to be 3 and the computed residual complexity is calculated to be 926. Row #4 shows a motion vector strategy for a macroblock which is partitioned into two blocks of 16×8 pixels and the motion estimation accuracy is a half pixel. The total number of bits required for coding the motion vector is calculated to be 5 and the computed residual complexity is calculated to be 926. Row #32 shows a motion vector strategy for a macroblock which is partitioned into 16 blocks of 4×4 pixels and the motion estimation accuracy is ¼ pixel. The total number of bits required for coding the motion vector is calculated to be 34 and the computed residual complexity is calculated to be 28.

As may be appreciated from table 400, the smaller the block size and the greater the accuracy the residual complexity tends to decrease but on account of an increase in the number of bits required to code the motion vector (the values in columns 406 and 408 have the general trend of increasing/decreasing). Therefore, a tradeoff may be made to select the maximum number of bits which may be used to code the motion vector vis a vis the maximum residual complexity value which may be acceptable. This tradeoff process is described in the following steps.

In a second step 304, suboptimal motion vector strategies are removed from table 400. Referring to FIG. 5 which shows table 400, in row #2, for a motion vector strategy including a macroblock 16×16 pixels which is not partitioned and an accuracy of a half pixel, the number of bits required to code the motion vector was calculated to be 3 bits and the residual complexity was calculated to be 1109. Comparing row #2 with row #3, where the motion vector strategy includes a macroblock divided into two smaller blocks, each 16×8 pixels, and an accuracy of a full pixel, it may be appreciated that the same number of bits (3 bits) are required to code the motion vector of row #3 as in row #2 yet the residual complexity is lower than that calculated for row #2 (e.g. the power or the entropy are lower than in row #2). Consequently, the motion vector strategy option of row #3 is better than that of row #2 and therefore, that of #2 may be discarded, as shown by the strikethrough line.

Similarly, comparing row #3 with row #4, where the motion vector strategy includes a macroblock divided into two smaller blocks, each 16×8 pixels, and an accuracy of a half pixel, it may be appreciated that the 5 bits are required to code the motion vector of row #4 whereas only 3 bits are required for the motion vector of row #3 yet the residual complexity is the same as that calculated for row #3 (e.g. the power or entropy are the same for row #4 and for row #3). Consequently, the motion vector strategy option of row #3 is better than that of row #4 and therefore, that of #4 may be discarded, as shown by the strikethrough line.

Figure 6:
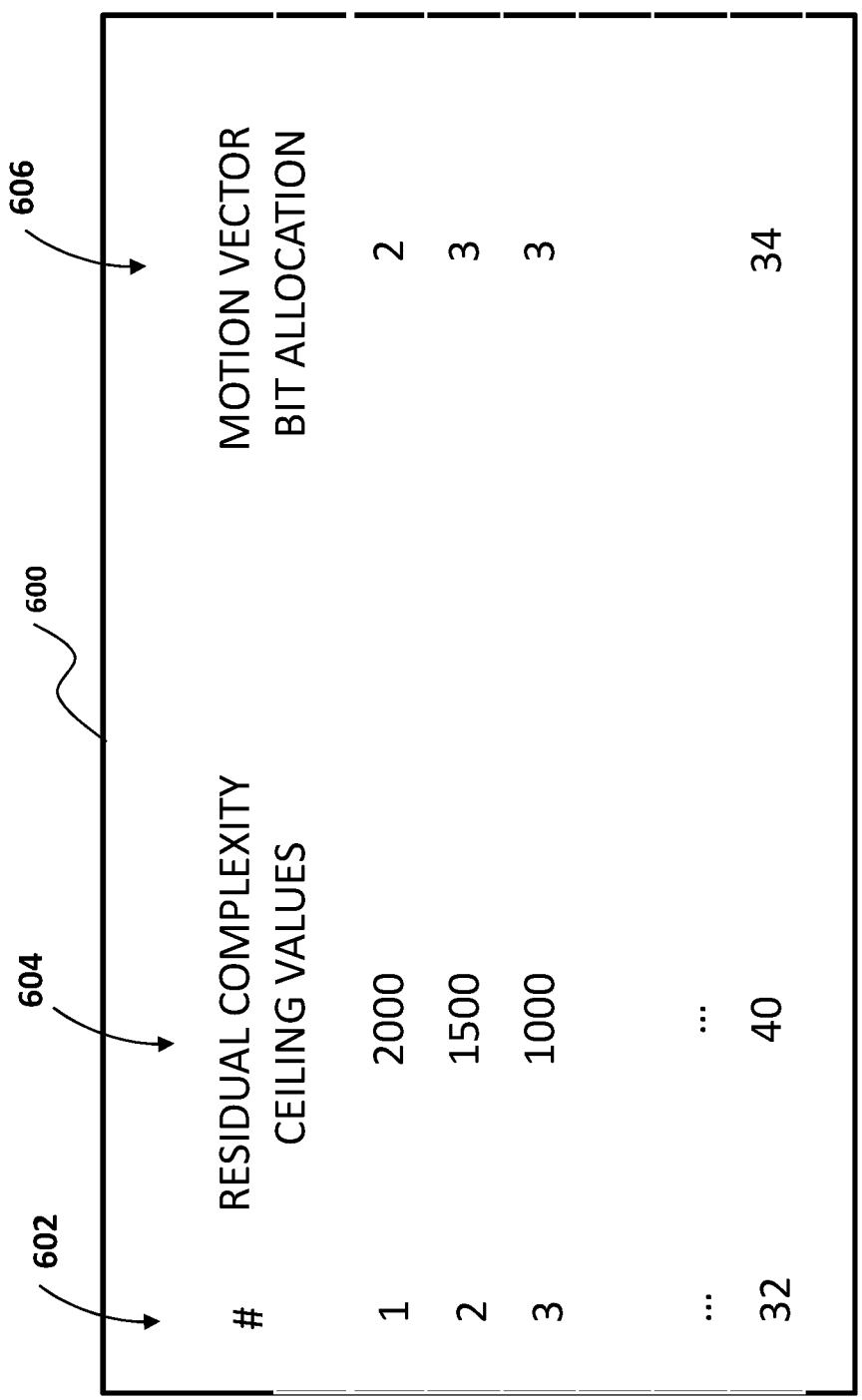
FIG. 6 is an exemplary table associated with a third step 306 of the method shown in FIG. 3, according to an embodiment of the present invention.

In a third step 306, which may be based on the results obtained for the various motion vector strategy options performed at step 302, a new table may be generated, for example as shown in FIG. 6 at table 600. A first column 602 lists row numbers, a second column 604 includes a listing of residual complexity ceiling values as inputs and a third column 606 includes a listing of the number of bits which need to be allocated for coding the motion vector below the ceiling values as an output. The selection of the residual complexity ceiling values may be discretionary, for example, as shown in second column 604, and may be selected as 2000, 1500, 1000, 900, and so on to 40 as shown. From table 400, it was calculated that 2 bits may be used to code the motion vector with a residual complexity of 1562 which is below the 2000 ceiling value, and therefore in column 606 in row #1 the value of 2 bits may be inserted (indicating that 2 bits are sufficient in order to achieve a residual complexity which is below 2000) Similarly, from table 400, it was calculated that 3 bits may be used to code the motion vector with a residual complexity of 1109 which is below the 1500 ceiling value, and therefore in column 606 in row #2 the value of 3 bits may be inserted (indicating that 3 bits are sufficient in order to achieve a residual complexity which is below 1500). Similarly, from table 400, it was calculated that 3 bits may be used to code the motion vector with a residual complexity of 926 which is below the 1000 ceiling value, and therefore in column 606 in row #3 the value of 3 bits may be inserted (indicating that 3 bits are sufficient in order to achieve a residual complexity which is below 1000). Similarly, from table 400, it was calculated that 34 bits may be used to code the motion vector with a residual complexity of 28 which is below the 40 ceiling value, and therefore in column 606 in row #32 the value of 34 bits may be inserted (indicating that 34 bits are sufficient in order to achieve a residual complexity which is below 40).

It should be noted that in step 306, a table as depicted in FIG. 6 is created for every macroblock, where each macroblocks has different values in column 606, but all of them have the same values in column 604. For example, in a macroblock "j", column 604 includes the numbers 2000, 1500, 1000 and 40 and column 606 includes the numbers 2, 3, 3 and 34, and in a macroblock "k", column 604 also includes the numbers 2000, 1500, 1000 and 40 but column 606 includes the numbers 3, 4, 5 and 31.

In a fourth step 308, a new table may be generated, for example as shown in FIG. 7 at table 700. Table 700 may be generated for the full superblock, where a superblock includes N macroblocks, for example N=240. In table 700, column 704 is identical to column 604 in each table 600 generated for all the macroblocks, and column 706 is computed by taking the average of each row in column 606 of all table 600 generated for all the macroblocks.

In table 700, a first column 702 lists row numbers, a second column 704 includes the listing of residual complexity ceiling values from column 604 in table 600 as inputs, and a third column 706 includes a listing of the average number of bits which need to be allocated for coding the motion vectors of all the macroblocks in the superblock below the ceiling values as an output. Computing the average number of bits to be allocated may require generating tables 400 and 600 for each macroblock in the superblock, for example, each table 400 and 600 may be generated 240 times for each one of the 240 macroblocks in the superblock. By averaging the number of bits for all the generated tables for each residual complexity ceiling value, the average number of bits for each residual complexity ceiling value may be determined and inserted in column 706 in table 700.

Once the superblock average number of bits to be allocated is determined to be below the residual complexity ceiling values, a target residual complexity ceiling may be selected based on the available code budget (i.e. based on bit rate/block, bandwidth, etc.). The code budget is an upper limit for the target number of bits to be allocated for describing the motion vectors coding. For example, referring to FIG. 8, if the available budget for vector motion coding is 3.8 bits, then rows #4 to #32 are discarded as the average number of bits required for motion vector coding is greater than 3.8 bits, and thus exceeding the budget.

This means that the system has enough budget to support rows #1 or #2 or #3. However, since the goal is to minimize the residual complexity, rows #1 and #2 may be discarded in table 700 as their residual complexity ceiling value (2000 and 1500 for row #1 and row #2, respectively) is larger than the one of row #3 (1000). Therefore, the target residual complexity may be selected at 1000.

Figure 8:
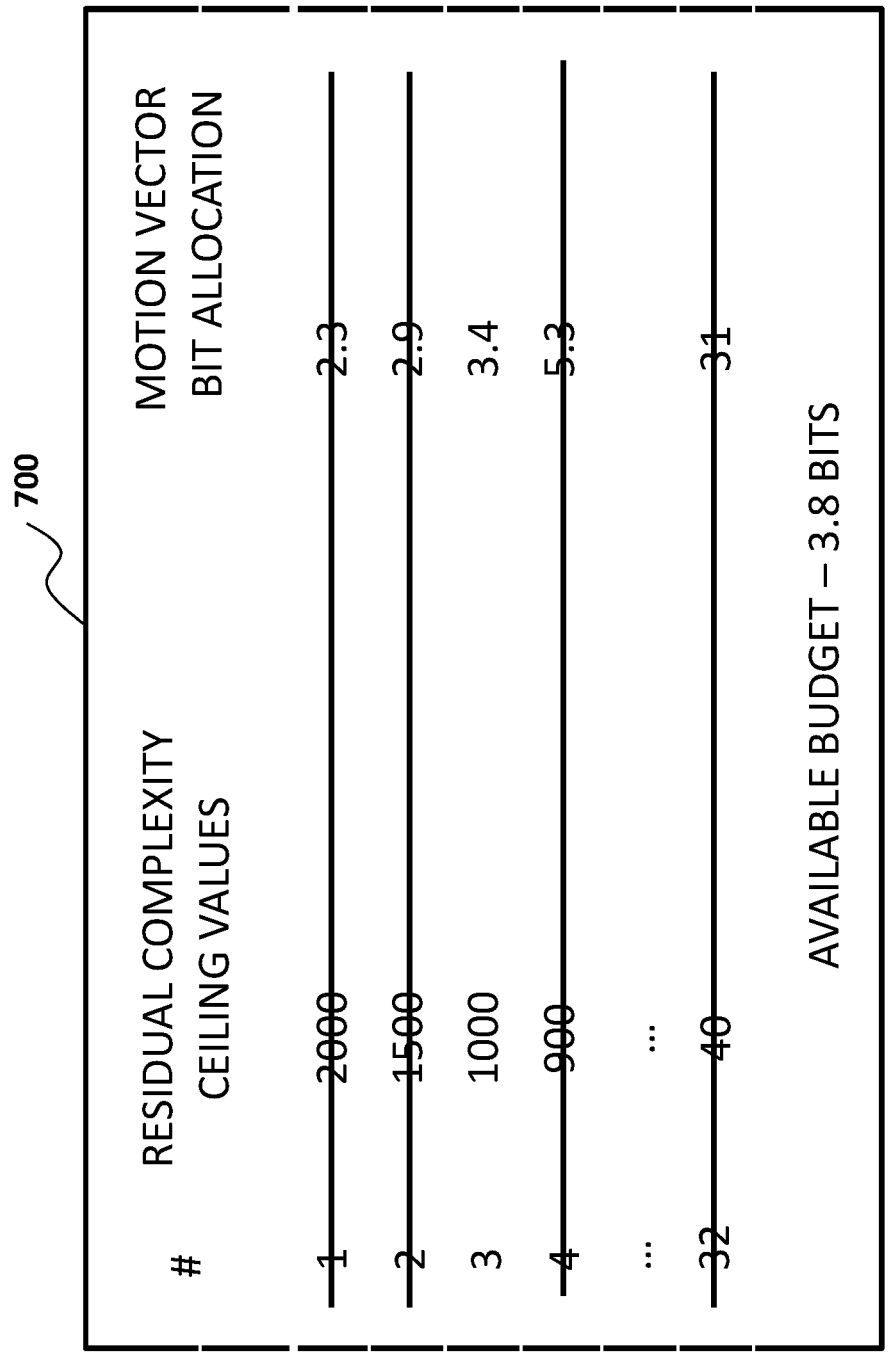
FIG. 8 is an exemplary table also associated with a fourth step 308 of the method shown in FIG. 3, according to an embodiment of the present invention.

In a fifth step 310, step 302 should be repeated for the macroblocks (16×16 pixels) in the video frame using for each macroblock a vector motion strategy (macroblock partitioning and pixel size) which yields the lowest number of bits while achieving the target residual complexity, for example, 1000 as per the example shown in FIGS. 7 and 8 in table 700. For example, if a certain macroblock has a table with values as indicated in Table 400 in FIG. 5, then that macroblock should choose row number 3 as the preferred strategy, as it yields the lowest number of bits which can still achieve a residual complexity which is below 1000.

Figure 9:
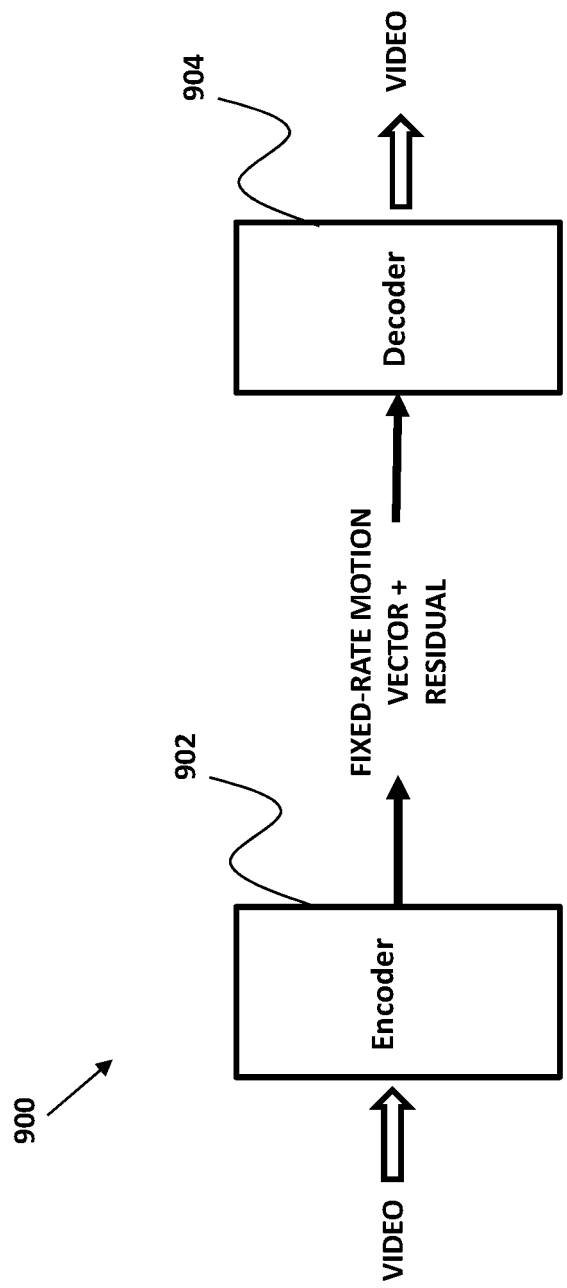
FIG. 9 schematically illustrates a video compression system including an encoder which may transmit fixed-rate motion vectors and residuals to a decoder suitable to decode the received transmissions, according to an embodiment of the present invention.

Reference is now made to FIG. 9 which schematically illustrates a video compression system 900 including an encoder 902 which may transmit fixed-rate motion vectors and residuals to a decoder 904 suitable to decode the received transmissions, according to an embodiment of the present invention. In some embodiments, encoder 902 may be configured to encode video frames, including performing interframe predictions on the video frames using method 300 shown in FIG. 3 and previously described. Decoder 904 may decode the transmissions from encoder 902, including the fixed-rate motion vectors and the residuals, and output the video.

Some embodiments may comprise a method of performing inter-frame prediction in video compression, the method comprising: partitioning a video frame into superblocks, each superblock comprising a plurality of macroblocks; determining an upper boundary on attributes associated with residual blocks of said plurality of macroblocks based on pre-defined constraints on the total number of bits allocated for motion vector descriptions in a superblock; and for each macroblock in a superblock, determining a partition size and a motion vector resolution which yield for all macroblocks in said superblock a motion vector description and a corresponding residual with attributes less than or equal to said upper boundary.

In some embodiments, each macroblock of the plurality of macroblocks comprises 16×16 pixels. In some embodiments, the attributes comprise a residual complexity. In some embodiments, the attributes comprise a measure of a total energy in the residual blocks. In some embodiments, the attributes comprise a measure of entropy of the quantized DCT taps of the residual blocks. In some embodiments, said partition size comprises any one of: 16×16 pixel size, 16×8 pixel size, 8×16 pixel size, 8×8 pixel size, 8×4 pixel size, 4×8 pixel size, 4×4 pixel size. In some embodiments, the method comprises: determining a number of bits required to code a motion vector for each of the block partitionings based on predetermined pixel accuracies.

In some embodiments, said motion vector resolution comprises any one of: a full pixel, a half pixel, a quarter pixel. In some embodiments, the method comprises: determining a residual complexity in a residual block associated with each of the block partitionings. In some embodiments, the method comprises: for each block partitioning, comparing the number of bits required to code a motion vector and a residual complexity value associated with the residual block. In some embodiments, the method comprises: discarding all block partitionings that are associated with motion vectors requiring the same number of bits for coding, except for the block partitioning with a least residual complexity value. In some embodiments, the method comprises: assigning an upper boundary requirement to residual complexity values of residual blocks.

Some embodiments may comprise an encoder for generating fixed-rate motion vectors for video compression, configured to perform the following steps: partition a video frame into superblocks, each superblock comprising a plurality of macroblocks; determine an upper boundary on attributes associated with residual blocks of said plurality of macroblocks based on pre-defined bit constraints on the total number of bits allocated for motion vector descriptions in a superblock; and for each macroblock in a superblock, determine a partition size and a motion vector resolution which yields for all macroblocks in said superblock a motion vector description and a corresponding residual with attributes less than or equal to said upper boundary.

In some embodiments, each macroblock of the plurality of macroblocks comprises 16×16 pixels. In some embodiments, attributes comprise a residual complexity. In some embodiments, the attributes comprise a measure of a total energy in the residual blocks. In some embodiments, the attributes comprise a measure of entropy of the quantized DCT taps of the residual blocks. In some embodiments, said partition size comprises any one of: 16×16 pixel size, 16×8 pixel size, 8×16 pixel size, 8×8 pixel size, 8×4 pixel size, 4×8 pixel size, 4×4 pixel size.

In some embodiments, the encoder is further configured to determine a number of bits required to code a motion vector for each of the block partitionings based on a predetermined motion vector resolution. In some embodiments, said motion vector resolution comprises any one of: a full pixel, a half pixel, a quarter pixel. In some embodiments, the encoder is further configured to determine a residual complexity in a residual block associated with each of said block partitionings. In some embodiments, the encoder is further configured to compare, for each block partitioning, the number of bits required to code a motion vector and a residual complexity value associated with the residual block. In some embodiments, the encoder is configured to discard all block partitionings that are associated with motion vectors requiring the same number of bits for coding except for the block partitioning with a least residual complexity value. In some embodiments, the encoder is configured to assign an upper boundary requirement to residual complexity values of residual blocks.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

Unless specifically stated otherwise, as apparent from the preceding discussions, it is appreciated that, throughout the specification, discussions utilizing terms such as "processing", "computing", "calculating", "determining", or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Any of the above-mentioned devices, units and/or systems, may be implemented by using suitable hardware components and/or software components; for example, a processor, a processing core, a Central Processing Unit (CPU), a Digital Signal Processor (DSP), an Integrated Circuit (IC), and Application-Specific Integrated Circuit (ASIC), a memory unit (e.g., Random Access Memory (RAM), Flash memory), a storage unit (e.g., hard disk drive (HDD), solid state drive (SDD), Hash memory), an input unit (keyboard, keypad, mouse, joystick, touch-pad, touch-screen, microphone), an output unit (screen, touch-screen, monitor, audio speakers), a power source (battery, rechargeable battery, power cell, connection to electric outlet), a wireless transceiver, a cellular transceiver, a wired or wireless modem, a network interface card or element, an accelerometer, a gyroscope, a compass unit, a Global Positioning System (GPS) unit, an Operating System (OS), drivers, applications, and/or other suitable components.

In some implementations, calculations, operations and/or determinations may be performed locally within a single device, or may be performed by or across multiple devices, or may be performed partially locally and partially remotely (e.g., at a remote component or a co-located component) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A method of performing inter-frame prediction in video compression, the method comprising:
   partitioning a video frame into superblocks, each superblock comprising a plurality of macroblocks;
   determining an upper boundary on attributes associated with residual blocks of said plurality of macroblocks based on pre-defined constraints on a total number of bits that are allocated for descriptors of motion vectors in a superblock; and
   for each macroblock in a superblock, determining a partition size and a motion vector resolution which yield, for all macroblocks in said superblock, descriptors of motion vectors and a corresponding residual block with attributes that are less than or equal to said upper boundary.

2. The method of claim 1,
   wherein each macroblock of the plurality of macroblocks comprises 16×16 pixels.

3. The method of claim 1,
   wherein the attributes comprise a residual complexity.

4. The method of claim 1,
   wherein the attributes comprise a measure of a total energy in the residual blocks.

5. The method of claim 1,
   wherein the attributes comprise a measure of entropy of quantized Discrete Cosine Transform (DCT) taps of the residual blocks.

6. The method of claim 1,
   wherein said partition size comprises any one of:
   16×16 pixel size,
   16×8 pixel size,
   8×16 pixel size,
   8×8 pixel size,
   8×4 pixel size,
   4×8 pixel size,
   4×4 pixel size.

7. The method of claim 1, comprising:
   determining a number of bits required to code a motion vector for each of the block partitionings based on predetermined pixel accuracies.

8. The method of claim 1,
   wherein said motion vector resolution comprises any one of:
   a full pixel,
   a half pixel,
   a quarter pixel.

9. The method of claim 1, comprising:
   determining a residual complexity in a residual block associated with each of the block partitionings.

10. The method of claim 1, comprising:
    for each block partitioning, comparing a number of bits required to code a motion vector and a residual complexity value associated with the residual block.

11. The method of claim 10, comprising:
    discarding all block partitionings that are associated with motion vectors requiring the same number of bits for coding, except for a block partitioning with a least residual complexity value.

12. The method of claim 1, comprising:
    assigning an upper boundary requirement to residual complexity values of residual blocks.

13. An encoder for generating fixed-rate motion vectors for video compression, configured to perform the following steps:
    partition a video frame into superblocks, each superblock comprising a plurality of macroblocks;
    determine an upper boundary on attributes associated with residual blocks of said plurality of macroblocks based on pre-defined bit constraints on a total number of bits that are allocated for descriptors of motion vectors in a superblock; and
    for each macroblock in a superblock, determine a partition size and a motion vector resolution which yield, for all macroblocks in said superblock, descriptors of motion vectors and a corresponding residual block with attributes that are less than or equal to said upper boundary.

14. The encoder of claim 13,
    wherein each macroblock of the plurality of macroblocks comprises 16×16 pixels.

15. The encoder of claim 13,
    wherein the attributes comprise a residual complexity.

16. The encoder of claim 13,
    wherein the attributes comprise a measure of a total energy in the residual blocks.

17. The encoder of claim 13,
    wherein the attributes comprise a measure of entropy of quantized Discrete Cosine Transform (DCT) taps of the residual blocks.

18. The encoder of claim 13,
    wherein said partition size comprises any one of:
    16×16 pixel size,
    16×8 pixel size,
    8×16 pixel size,
    8×8 pixel size,
    8×4 pixel size,
    4×8 pixel size,
    4×4 pixel size.

19. The encoder of claim 13,
    wherein the encoder is further configured to determine a number of bits required to code a motion vector for each of the block partitionings based on a predetermined motion vector resolution.

20. The encoder of claim 13,
    wherein said motion vector resolution comprises any one of:
    a full pixel,
    a half pixel,
    a quarter pixel.

21. The encoder of claim 13,
    wherein the encoder is further configured to determine a residual complexity in a residual block associated with each of said block partitionings.

22. The encoder of claim 21,
    wherein the encoder is further configured to compare, for each block partitioning, a number of bits required to code a motion vector and a residual complexity value associated with the residual block.

23. The encoder of claim 13,
wherein the encoder is further configured to discard all block partitionings that are associated with motion vectors requiring the same number of bits for coding except for a block partitioning with a least residual complexity value.

24. The encoder of claim 13,
wherein the encoder is further configured to assign an upper boundary requirement to residual complexity values of residual blocks.

* * * * *